United States Patent [19]
Hayes et al.

[11] Patent Number: 6,103,863
[45] Date of Patent: Aug. 15, 2000

[54] PROCESS FOR PREPARATION OF POLYAMIDE FROM DINITRILE AND DIAMINE

[75] Inventors: Richard Allen Hayes, Brentwood, Tenn.; David Neil Marks, Newark; Maria Van Eijndhoven, Bear, both of Del.

[73] Assignee: E. I. Dupont de Nemours & Company, Wilmington, Del.

[21] Appl. No.: 09/217,797

[22] Filed: Dec. 22, 1998

[51] Int. Cl.$^7$ .................................................. C08G 69/28
[52] U.S. Cl. .................... 528/332; 528/310; 528/312; 528/315; 528/322; 528/323; 528/324; 528/335; 528/336
[58] Field of Search ..................... 528/310, 312, 528/315, 324, 323, 335, 332, 336, 322

[56] References Cited

U.S. PATENT DOCUMENTS

| | | | |
|---|---|---|---|
| T875,023 | 6/1970 | Knowles et al. | |
| 2,245,129 | 6/1941 | Greenewalt | 260/2 |
| 3,833,647 | 9/1974 | Gelbein et al. | 260/515 |
| 3,847,876 | 11/1974 | Onsager | 260/78 |
| 3,922,147 | 11/1975 | Sze et al. | 23/283 |
| 3,968,152 | 7/1976 | Sze et al. | 260/515 |
| 4,214,087 | 7/1980 | Fannelli et al. | 546/319 |
| 4,436,898 | 3/1984 | Hofmann et al. | 528/336 |
| 4,490,521 | 12/1984 | Coffey et al. | 528/336 |
| 4,501,881 | 2/1985 | Greene et al. | 528/336 |
| 4,520,190 | 5/1985 | Coffey et al. | 528/336 |
| 4,528,362 | 7/1985 | Hofmann et al. | 528/336 |
| 4,542,205 | 9/1985 | Curatolo et al. | 528/336 |
| 4,543,407 | 9/1985 | Curatolo et al. | 528/336 |
| 4,568,736 | 2/1986 | Curatolo et al. | 528/313 |
| 4,603,192 | 7/1986 | Coffey et al. | 528/336 |
| 4,629,776 | 12/1986 | Curatolo et al. | 528/313 |
| 4,640,976 | 2/1987 | Curatolo et al. | 528/336 |
| 4,689,394 | 8/1987 | Curatolo et al. | 528/336 |
| 4,719,285 | 1/1988 | Curatolo et al. | 528/336 |
| 4,725,666 | 2/1988 | Curatolo et al. | 528/336 |
| 4,732,965 | 3/1988 | Curatolo et al. | 528/336 |
| 4,734,487 | 3/1988 | Curatolo et al. | 528/336 |
| 4,739,035 | 4/1988 | Shyu et al. | 528/335 |
| 4,749,776 | 6/1988 | Sentman et al. | 528/336 |
| 4,801,748 | 1/1989 | Murahashi et al. | 564/126 |
| 4,942,220 | 7/1990 | Murahashi et al. | 528/336 |
| 5,109,104 | 4/1992 | Marks | 528/313 |
| 5,185,427 | 2/1993 | Marks | 528/329.1 |
| 5,432,254 | 7/1995 | Liehr et al. | 528/335 |
| 5,596,070 | 1/1997 | Gotz | 528/310 |
| 5,627,257 | 5/1997 | Leihr | 528/335 |
| 5,674,974 | 10/1997 | Brearley et al. | 528/340 |

FOREIGN PATENT DOCUMENTS

| | | | |
|---|---|---|---|
| 44 18 540 A1 | 5/1994 | Germany | C08G 69/28 |
| 196 35 077 A1 | 8/1996 | Germany | C08G 69/00 |
| 1260755 | 2/1969 | United Kingdom | C07C 63/26 |
| 1377333 | 2/1973 | United Kingdom | C07C 63/00 |
| WO98/08889 A2 | 3/1998 | WIPO | C08G 60/00 |

*Primary Examiner*—P. Hampton-Hightower
*Attorney, Agent, or Firm*—Shanks & Herbert

[57] ABSTRACT

A two-step process for the production of polyamides from α,ω-dinitriles and α,ω-diamines involving the catalytic hydrolysis of the α,ω-dinitrile by addition of water with simultaneous purging of the reactor (i.e., venting of ammonia and water vapor) in the first step followed by polymerization by addition of the α,ω-diamine to the hydrolysate in the second step. Such a process is particularly useful in the production of poly(hexamethylene adipamide), i.e., nylon 6,6, from adiponitrile and hexamethylene diamine using lower catalyst levels during hydrolysis and resulting in reduced levels of bis(hexamethylene)triamine, BHMT, in the polymer.

13 Claims, No Drawings

PROCESS FOR PREPARATION OF POLYAMIDE FROM DINITRILE AND DIAMINE

BACKGROUND OF THE INVENTION

1. Field of the Invention

This invention relates to a two-step process for the production of polyamides from α,ω-dinitriles and α,ω-diamines. More specifically, the invention relates to a process for preparing polyamides wherein hydrolysis of the dinitrile is achieved by addition of water with simultaneous purging (i.e., venting) of water vapor prior to polymerization by addition of diamine to the hydrolysate.

2. Description of the Prior Art

Polyamides are conventionally prepared by the condensation polymerization of a diacid, such as adipic acid, and a diamine such as hexamethylene diamine, or by the polymerization of lactams such as ε-caprolactam. Other processes are known which involve preparation of polyamides by reaction from α,ω-dinitriles and α,ω-diamines in the presence of water. For example, Greenewalt U.S. Pat. No. 2,245,129 discloses a two-stage process in which a reaction mixture comprising a dinitrile, diamine, and water is heated in a first stage in a closed reaction vessel until a low molecular weight polyamide is formed, followed by heating at atmospheric or reduced pressure to remove liberated ammonia and excess water in a second stage to form a higher molecular weight polyamide.

Shyu et al. U.S. Pat. No. 4,739,035 discloses a two-step process for manufacturing polyamides from α,ω-dinitriles and α,ω-diamines in the presence of water comprising reacting the dinitrile and water in the presence of a catalyst under autogenous pressure and at a temperature sufficient to cause substantial hydrolysis of the dinitrile and subsequently adding the diamine to the resulting hydrolysate. The resulting reaction mixture is heated at a temperature sufficient to cause polymerization. Up to about 10 weight percent of the diamine may be present during the hydrolysis step. Addition of the major portion of the diamine after substantial hydrolysis of the dinitrile reduces the formation of triamines, for example bis(hexamethylene)triamine (BHMT) when the diamine is hexamethylene diamine. The polyamides formed had triamine levels in the range of 200 to 1,300 ppm compared to 1,420 to 1,610 ppm obtained using processes in which the diamine was added gradually over the course of the reaction. The presence of triamine causes branching and cross-linking of the polyamide which results in gelation and significant polymer quality deterioration.

Liehr U.S. Pat. No. 5,627,257 discloses a two-step process which claims to further reduce triamine formation. In the first step, the dinitrile is hydrolyzed under autogenous pressure until at least 85% of the hydrolysis product is dicarboxylic acid prior to addition of the diamine. The hydrolysis is conducted in a weakly acidic medium in the presence of a catalyst system of at least one oxygen-containing acid of phosphorus and/or at least one water-soluble calcium, zinc, manganese or cadmium salt. The pH of the hydrolysis reaction medium is adjusted by adding a sufficient amount of at least one saturated aliphatic or aromatic dicarboxylic acid. The dicarboxylic acid solution from the first step is reacted in a second step with at least an equimolar amount of diamine, expelling the resulting ammonia and water at an elevated pressure and temperature, and then polycondensing the mixture to yield a spinnable polyamide while gradually releasing the pressure. Triamine levels of between 500 and 600 ppm were achieved. A shortcoming of this process is that substantial amounts of co-catalyst are utilized. For example, the level of the dicarboxylic acid used ranged from about 1 to 13 weight percent based on the adiponitrile level.

BRIEF SUMMARY OF THE INVENTION

The present invention overcomes the shortcomings of known processes by providing polyamides with low levels of triamine impurities without the need for high amounts of cocatalysts. More specifically, the present invention provides a two step process (i.e., α,ω-dinitriles hydrolysis followed by the addition of the α,ω-diamine and polymerization) utilizing a catalyst. The polyamide product of the invention has been found to have lowered triamine levels when compared to a two step processes which does not utilize the novel water purge step and simultaneous venting of water and ammonia during hydrolysis.

Thus, the present invention provides an improved process for producing polyamide from an α,ω-dinitrile and an α,ω-diamine comprising the steps of:

(a) contacting an α,ω-dinitrile with water and an effective amount catalyst in a reactor, in the absence of the α,ω-diamine, at a temperature and a pressure to cause hydrolysis of the α,ω-dinitrile, and for a time sufficient to hydrolyze the α,ω-dinitrile to an overall conversion of at least 95%; wherein water is added during said hydrolysis with simultaneous venting of the reactor to remove ammonia and water vapor;

(b) adding an α,ω-diamine to said hydrolysate produced in step (a)

(c) heating the hydrolysate and diamine mixture in the presence of water for a time sufficient to polymerize; and then (d) recovering polyamide characterized by low triamine content.

In one embodiment of the process the α,ω-dinitrile is adiponitrile, the α,ω-diamine is hexamethylenediamine, and the catalyst for hydrolysis is a mixture of phosphorous acid and calcium hypophosphite, wherein the recovered polyamide is poly(hexamethylene adipamide) characterized by a BHMT content of below 1,000 ppm.

DETAILED DESCRIPTION OF INVENTION

The process of the current invention comprises a two-step process for preparing polyamides from at least one α,ω-dinitrile and at least one α,ω-diamine. In the first step, the α,ω-dinitrile is contacted with water in a reactor in the presence of a catalyst, and in the absence of the α,ω-diamine, at a temperature and a pressure sufficient to cause hydrolysis of the α,ω-dinitrile. During the hydrolysis step, water is added to the reactor and the ammonia formed during the hydrolysis and a portion of the water is removed by venting the reactor.

In the second step of the process of the current invention, the hydrolysate from the first step is contacted with the diamine at a temperature sufficient to cause polymerization and form a polyamide. The pressure is generally reduced during the polymerization and water and ammonia is removed, for example by venting, to increase the molecular weight of the polyamide.

The α,ω-dinitriles useful in the process of the current invention have the formula:

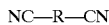

where R is a divalent aliphatic (straight chain or branched), alicyclic or aromatic organic radical containing 1 to 20 carbon atoms. Preferably R is a divalent straight chain aliphatic radical containing 2 to 8 carbon atoms. Representative α,ω-dinitriles include adiponitrile, suberonitrile, sebaconitrile, 1,12-dodecane dinitrile, terephthalonitrile, methyl glutaronitrile and the like. The preferred α,ω-dinitrile is adiponitrile.

The α,ω-diamines useful in the process of the current invention have the formula:

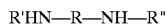

where R is as defined above, and R' and R" are each independently selected from hydrogen or a univalent aliphatic, alicyclic or aromatic radical. R' and R" are preferably hydrogen particularly when high molecular weight product is desired. α,ω-Diamine useful in the process of the current invention include hexamethylene diamine, tetramethylene diamine, 1,12-dodecane diamine, and p-xylene diamine. The preferred α,ω-diamine is hexamethylene diamine.

The catalyst used in the hydrolysis step can include any substance which promotes the hydrolysis of nitriles. Without the catalyst, the hydrolysis reaction is slow and leads to an increase in degradation products. Representative classes of catalysts include oxygen-containing phosphorus compounds, oxygen-containing boron compounds, oxygen-containing sulfur compounds, metal-containing compounds, such as copper or manganese, aliphatic and aromatic carboxylic acids, and Lewis acids. Specific examples of catalysts include phosphoric acid, phosphorous acid, hypophosphorous acid, pyrophosphoric acid, sodium hypophosphite hydrate, manganese(II)hypophosphite monohydrate, calcium hypophosphite, sulfuric acid, sulfamic acid, sodium bisulfate, ammonium hydrogen sulfate, phosphotungstic acid hydrate, phosphomolybdic acid hydrate, zinc acetate dihydrate, zinc sulfate heptahydrate, copper(II)acetate monohydrate, calcium acetate, acetic acid, glycolic acid, adipic acid, terephthalic acid, lanthanum trifluoromethanesulfonate, manganese(II)acetate tetrahydrate, cetyltrimethylammonium bromide, and 12-molybdosilicic acid hydrate. Mixtures of catalysts can be used. An effective amount of catalyst to promote the hydrolysis is needed in the present invention. The effective amount of catalyst will depend on the catalyst type. Typically this falls within the range of 0.10 to 500 mmole of catalyst based on one mole of dinitrile.

Water is used in the current invention both as a reactant in the hydrolysis of the dinitrile in the first step and as a processing aid in the polymerization in the second step. The amount of water used in the hydrolysis step should be at least equal in stoichiometry to the amount of dinitrile to be hydrolyzed. Typically an excess of water is used. Up to about 1,000 mol % water may be added with the dinitrile at the start of the hydrolysis step.

In the hydrolysis step, the dinitrile, water, and catalyst are heated at a temperature of between 200° C. and 300° C., preferably between 220° C. and 280° C., while purging the reaction by pumping water into the reactor and removing some portion of the added water, as steam, through venting. Ammonia formed during the hydrolysis is also removed during venting. The reactor design is not critical. Examples of suitable reactors include stirred autoclaves, unstirred autoclaves, column reactors, tube reactors, and loop reactors. The process is generally run in the absence of air. The air may be removed by any known process such as by purging the reactor with inert gases, including nitrogen or argon, evacuating the reactor and filling it with inert gases, and pressurizing the reactor with inert gases followed by venting to 1 atmosphere. These processes may be repeated as many times as desired. The temperature range of the process is determined by the rate of the hydrolysis reaction. At temperatures below 200° C., the rate of the hydrolysis reaction is generally too low to be economically useful. At temperatures above 300° C., significant amounts of byproducts may be formed. The reaction temperature can be maintained constant throughout the course of the reaction or can be varied. The rate of water addition into the reaction varies depending on the reaction scale, the reactor size, the reactor design, the reaction temperature and the like. In general, the rate of water addition will be within the range of 0.01 to 100 moles of water per hour based on 1 mole of the dinitrile. Preferably, the rate of water addition will be within the range of 0.1 to 10 moles of water per hour based on 1 mole of dinitrile. The water purge may be turned on at any stage of the hydrolysis process. The purge rate may be constant throughout the hydrolysis, the rate may be varied, or the purge may be turned off and on over the course of the hydrolysis.

The reaction pressure during hydrolysis is maintained between about 25 to 1,000 psig. The reaction pressure may be controlled by the vent setting. The length of the hydrolysis process will be a function of the reaction temperature, process design, reaction catalyst type and level and the like. The reaction time should be sufficient to hydrolyze at least 95 mole percent of the nitrile groups. Preferably, the time should be long enough to hydrolyze at least 98 mole percent of the nitrile groups.

In the second step of the current invention, diamine is added to the hydrolysate formed in the first step and polymerized to form a polyamide. The α,ω-diamine should be added at a level of within 10 mole percent of equimolar based on the starting α,ω-dinitrile. The exact level will be determined by the molecular weight desired, the reactor design, losses of the dinitrile during the hydrolysis process, and losses of diamine during the polymerization process. Preferably the polyamide formed has balanced amine ends, or a slight excess of acid ends so that high molecular weight polyamide is obtained. It has been found that some of the α,ω-dinitrile may be lost during the hydrolysis step due to formation of cyclopentanone, which is volatile and is removed during venting of the reactor with the aqueous purge. Therefore, levels of diamine that are less than equimolar based on the starting α,ω-dinitrile have been found to provide improved polymer quality by improving the balance of amine and acid ends and reducing the level of BHMT in the polymer. Other substances can be added with the diamine such as water, stabilizers, polymerization catalysts, and processing aids. Addition of water to the diamine facilitates transfer of all of the diamine to the reactor. All of the diamine can be added at the start of the polymerization step or the diamine can be added gradually during the polymerization.

The polymerization process involves heating the hydrolysate from the first step, diamine, and water at a temperature of between about 200° C. to 350° C. The temperature of the process is determined by the rate of the polymerization and the melting point of the product polymer. The reactor design is not critical. The reactor may be the same reactor design used for the hydrolysis process or may be different. The process is generally run in the absence of air. The air may be removed by any known process including those described for the hydrolysis step. The pressure in the polymerization process may be in the range of 0 to 1,000 psig or may be performed under vacuum. The pressure may be constant throughout the polymerization process or may be varied.

Generally the pressure will be reduced during the polymerization process. The reaction time required to form polymer will be a function of the specific reactants, the product desired, the reaction temperature, the reaction pressure, and the like. Generally the polymerization process will require from 0.1 to 10 hours. The specific temperature/pressure profile will generally depend on the specific reactants used and the product desired. It has been found that when poly(hexamethylene adipamide) is prepared from adiponitrile hydrolysate and hexamethylene diamine using the process of the current invention, the polymerization process may include heating the reactants to between 250° C. and 310° C. with pressures between 200 and 300 psig (set by the vent), followed by reducing the pressure to atmospheric and finishing in the temperature range of about 250° C. to 310° C.

Test Methods:

In the following Examples the composition of the reaction mixture obtained by hydrolysis of adiponitrile was determined by high pressure liquid chromatography (HPLC) analysis with a UV detector. This method does not detect adiponitrile in the reaction mixture. The weight percent reported for the reaction products is based on the total weight of the hydrolysate.

The poly(hexamethylene adipamide) prepared in the Examples was analyzed for amine and acid ends by the methods described on pages 293 and 294 in volume 17 of the "Encyclopedia of Industrial Chemical Analysis" published by John Wiley & Sons, Inc. in 1973.

The relative viscosity (RV) of the polyamide samples was measured as the ratio of the viscosity of a solution of 8.4 wt % polymer in a solution of 90 wt % formic acid and 10 wt % water at 25° C., to the viscosity of the formic acid-water solution, measured in the same units at 25° C.

Bis(hexamethylene)triamine (BHMT) levels were determined by gas chromatography (GC) analysis of polyamide hydrolysate prepared by hydrolyzing the polyamide in hydrochloric acid.

EXAMPLE 1

This example demonstrates the hydrolysis of adiponitrile at 270° C. using a water purge in a vented reactor with a combination of phosphorous acid and calcium hypophosphite as the hydrolysis catalyst.

A mixture of adiponitrile (150.00 grams, 1.39 mole), water (125.00 grams, 6.94 mole), phosphorous acid (0.075 grams), and calcium hypophosphite (0.027 grams) was added to a 1 liter stainless steel autoclave at room temperature. The autoclave was pressurized to 60 psig with nitrogen and the pressure was then released. This operation was repeated for a total of 6 times. After releasing the pressure the final time, the reaction mixture was stirred and the autoclave heated to 270° C. After achieving 270° C., water was pumped into the autoclave at a rate of 1 mL per minute. Through venting, the reaction pressure was maintained between 608 and 514 psig during the course of the experiment. After 2 hours of purging with water at 270° C., the water purge was stopped and the closed autoclave was allowed to cool to room temperature. A sample of the contents of the autoclave was analyzed by HPLC. The results of the HPLC analysis are reported below in Table 1. No nitrile-containing compounds were detected in the hydrolysate.

COMPARATIVE EXAMPLE A

This example demonstrates the hydrolysis of adiponitrile at 270° C. in a closed reactor, under autogenous pressure using a combination of phosphorous acid and calcium hypophosphite as the hydrolysis catalyst.

A mixture of adiponitrile (150.00 grams, 1.39 mole), water (125.00 grams, 6.94 mole), phosphorous acid (0.075 grams), and calcium hypophosphite (0.027 grams) was added to a 1 liter stainless steel autoclave at room temperature. The autoclave was pressurized to 60 psig with nitrogen and then the pressure was released. This operation was repeated for a total of 6 times. With stirring, the autoclave was heated to 270° C. After achieving 270° C., a peak autogenous pressure of 635 psig was observed. During the course of this operation the pressure slowly reduced to 481 psig observed at the end. After 2 hours at 270° C., the autoclave was allowed to cool to room temperature. A sample of the contents of the autoclave was analyzed by HPLC. The results of the HPLC analysis are reported below in Table 1. The results for Example 1 and Comparative Example A demonstrate the improved conversion of nitrile ends when the hydrolysis is conducted with an aqueous purge compared to autogenous pressure in a closed reactor. Nitrile-containing compounds were not detected in the hydrolysate of Example 1, whereas the hydrolysate of Comparative Example A contained 16.4 wt % 5-cyanovaleramide and 16.3 wt % 5-cyanovaleric acid.

EXAMPLE 2

This example demonstrates the hydrolysis of adiponitrile at 230° C. with a water purge in a vented reactor maintained at a pressure between 347 and 318 psig using a combination of phosphorous acid and calcium hypophosphite as the hydrolysis catalyst.

A mixture of adiponitrile (150.00 grams, 1.39 mole), water (125.00 grams, 6.94 mole), phosphorous acid (0.075 grams), and calcium hypophosphite (0.027 grams) was added to a 1 liter stainless steel autoclave at room temperature. The autoclave was pressurized to 60 psig with nitrogen and the pressure was then released. This operation was repeated for a total of 6 times. With stirring, the autoclave was heated to 230° C. After achieving 230° C., a water purge was pumped into the autoclave at a rate of 1 mL per minute. Through venting, the reaction pressure was maintained between 347 and 318 psig during the course of the experiment. After 6 hours at 230° C., the water purge was stopped and the autoclave was allowed to cool to room temperature. A sample of the contents of the autoclave was analyzed by HPLC. The results of the HPLC analysis are reported below in Table 1. The hydrolysate contained no detectable 5-cyanovaleramide and 1.6 wt % of 5-cyanovaleric acid.

EXAMPLE 3

This example demonstrates the hydrolysis of adiponitrile at 230° C. with a water purge in a vented reactor maintained at a pressure between 330 and 277 psig using a combination of phosphorous acid and calcium hypophosphite as the hydrolysis catalyst.

A mixture of adiponitrile (150.00 grams, 1.39 mole), water (125.00 grams, 6.94 mole), phosphorous acid (0.075 grams), and calcium hypophosphite (0.027 grams) was added to a 1 liter stainless steel autoclave at room temperature. The procedure of Example 2 was followed except the pressure in the reactor was maintained between 330 and 277 psig during the course of the experiment. A sample of the contents of the autoclave was analyzed by HPLC. The results of the HPLC analysis are reported below in Table 1. The hydrolysate contained no detectable 5-cyanovaleramide and 1.4 wt % of 5-cyanovaleric acid.

EXAMPLE 4

This example demonstrates the hydrolysis of adiponitrile at 230° C. with a water purge in a vented reactor maintained at a pressure between 259 and 206 psig using a combination of phosphorous acid and calcium hypophosphite as the hydrolysis catalyst.

A mixture of adiponitrile (150.00 grams, 1.39 mole), water (125.00 grams, 6.94 mole), phosphorous acid (0.075 grams), and calcium hypophosphite (0.027 grams) was added to a 1 liter stainless steel autoclave at room temperature. The procedure of Example 2 was followed except the pressure in the reactor was maintained between 259 and 206 psig during the course of the experiment. A sample of the contents of the autoclave was analyzed by HPLC. The results of the HPLC analysis are reported below in Table 1. The hydrolysate contained no detectable 5-cyanovaleramide and 0.5 wt % of 5-cyanovaleric acid.

EXAMPLE 5

This example demonstrates the hydrolysis of adiponitrile at 230° C. with a water purge in a vented reactor maintained at a pressure between 329 and 291 psig using calcium hypophosphite as the hydrolysis catalyst.

A mixture of adiponitrile (150.00 grams, 1.39 mole), water (125.00 grams, 6.94 mole), and calcium hypophosphite (0.183 grams) was added to a 1 liter stainless steel autoclave at room temperature. The procedure of Example 2 was followed except the pressure in the reactor was maintained between 329 and 291 psig during the course of the experiment. A sample of the contents of the autoclave was analyzed by HPLC. The results of the HPLC analysis are reported below in Table 1. The hydrolysate contained 1.0 wt % 5-cyanovaleramide and 1.6 wt % of 5-cyanovaleric acid. Conversion of the nitrile groups was less than that obtained in Example 3, which used a combination of calcium hypophosphite and phosphorous acid catalyst.

EXAMPLE 6

This example demonstrates the hydrolysis of adiponitrile at 230° C. with a water purge in a vented reactor maintained at a pressure between 324 and 305 psig using half the amount of calcium hypophosphite hydrolysis catalyst as that used in Example 5.

A mixture of adiponitrile (150.00 grams, 1.39 mole), water (125.00 grams, 6.94 mole), and calcium hypophosphite (0.091 grams) was added to a 1 liter stainless steel autoclave at room temperature. The procedure of Example 5 was followed with the pressure in the reactor being maintained between 324 and 305 psig during the course of the experiment. A sample of the contents of the autoclave was analyzed by HPLC. The results of the HPLC analysis are reported below in Table 1. The hydrolysate contained 0.6 wt % 5-cyanovaleramide and 1.4 wt % of 5-cyanovaleric acid. Conversion of the nitrile groups was less than that obtained in Example 3, which used a combination of calcium hypophosphite and phosphorous acid catalyst.

EXAMPLE 7

This example demonstrates the hydrolysis of adiponitrile at 230° C. with a water purge in a vented reactor maintained at a pressure between 359 and 299 psig using adipic acid as the hydrolysis catalyst.

A mixture of adiponitrile (150.00 grams, 1.39 mole), water (125.00 grams, 6.94 mole) and adipic acid (22.50 grams, 0.15 mole) was added to a 1 liter stainless steel autoclave at room temperature. The procedure of Example 2 was followed with the pressure in the reactor being maintained between 359 and 299 psig during the course of the experiment. A sample of the contents of the autoclave was analyzed by HPLC. The results of the HPLC analysis are reported below in Table 1. The hydrolysate contained no detectable 5-cyanovaleramide and 1.1 wt % of 5-cyanovaleric acid.

EXAMPLE 8

This example demonstrates the hydrolysis of adiponitrile at 230° C. with a water purge in a vented reactor maintained at a pressure between 332 and 266 psig using zinc sulfate as the hydrolysis catalyst.

A mixture of adiponitrile (150.00 grams, 1.39 mole), water (125.00 grams, 6.94 mole) and zinc sulfate heptahydrate (0.309 grams) was added to a 1 liter stainless steel autoclave at room temperature. The procedure of Example 2 was followed with the pressure in the reactor being maintained between 332 and 266 psig during the course of the experiment. A sample of the contents of the autoclave was analyzed by HPLC. The results of the HPLC analysis are reported below in Table 1. The hydrolysate contained 0.4 wt % 5-cyanovaleramide and 1.1 wt % of 5-cyanovaleric acid.

TABLE 1

Hydrolysis Product Analysis[b]

| Example | 5-Cyano Adipamide (wt %) | Adipamic Acid (wt %) | 5-Cyano Valeramide (wt %) | Adipic Acid (wt %) | Valeric Acid (wt %) |
|---|---|---|---|---|---|
| 1 | 11.9 | 26.8 | Nd[a] | 9.7 | ND |
| A | 13.7 | 25.1 | 16.4 | 6.4 | 16.3 |
| 2 | 13.4 | 33.0 | ND | 33.5 | 1.6 |
| 3 | 9.2 | 29.0 | ND | 39.2 | 1.4 |
| 4 | 10.6 | 31.9 | ND | 39.3 | 0.5 |
| 5 | 17.5 | 35.2 | 1.0 | 26.7 | 1.6 |
| 6 | 12.4 | 33.1 | 0.6 | 35.5 | 1.4 |
| 7 | 11.0 | 32.1 | ND | 36.8 | 1.1 |
| 8 | 12.9 | 34.5 | 0.4 | 34.1 | 1.1 |

[a]"ND" signifies that the material was not detected.
[b]Reported results represent the average of two determinations.

EXAMPLE 9

This example demonstrates the two step process of the current invention. Adiponitrile is hydrolyzed with an aqueous purge using a combination of phosphorus acid and calcium hypophosphite as the catalyst followed by addition of hexamethylene diamine and polycondensation to form poly(hexamethylene adipamide).

A mixture of adiponitrile, (39.00 grams, 0.36 mole), water (32.40 grams, 1.80 mole), phosphorous acid (0.02 grams), and calcium hypophosphite (0.007 grams), was added to a 300 cc stainless steel autoclave. The autoclave was pressurized to 300 psig with nitrogen and then the pressure was released. This operation was repeated for a total of 3 times. The autoclave was then pressurized to 300 psig with nitrogen, vented to 20 psig nitrogen, and heated to 250° C. with stirring. After achieving 250° C., a water purge was pumped into the autoclave at a rate of 6 cc per hour. Through venting, the reaction pressure was maintained at 250 psig throughout the course of the experiment. After 6 hours at 250° C., the water purge was discontinued and the autoclave was allowed to cool to room temperature. The autoclave was opened and hexamethylenediamine (40.20 grams, 0.35 mole) and water (25.00 grams) were added. The autoclave was resealed, pressurized to 300 psig with nitrogen, and then the pressure was released. This operation was repeated for a total of 3 times. The autoclave was then pressurized to 300 psig with nitrogen followed by venting to 20 psig nitrogen. The autoclave was heated to 275° C. with stirring and the vent set at 250 psig. After achieving 275° C., the pressure was reduced to atmospheric pressure over one hour. The polymerization was finished at atmospheric pressure and 275° C. for 45 minutes and then the autoclave was allowed to cool to room temperature. The resulting product was analyzed for relative viscosity (RV), end groups, and bis(hexamethylene)triamine (BHMT) level with the results shown below in Table 2.

EXAMPLE 10

A mixture of adiponitrile (39.00 grams, 0.36 mole), water (32.40 grams, 1.80 mole), phosphorous acid (0.02 grams), and calcium hypophosphite (0.007 grams) was added to a 300 cc stainless steel autoclave. The hydrolysis procedure described in Example 9 was followed except that the water purge was pumped into the autoclave at a rate of 9 cc/hour instead of 6 cc/hour. After hydrolysis, the autoclave was opened and hexamethylenediamine (40.20 grams, 0.35 mole), and water (5.0 grams) were added. The autoclave was resealed and polycondensation was conducted using the procedure described in Example 9. The resulting product was analyzed for relative viscosity (RV), end groups, and bis(hexamethylene)triamine (BHMT) level with the results shown below in Table 2.

EXAMPLE 11

A mixture of adiponitrile (39.00 grams, 0.36 mole), water (32.40 grams, 1.80 mole), phosphorous acid (0.02 grams), and calcium hypophosphite (0.007 grams) was added to a 300 cc stainless steel autoclave. The hydrolysis procedure described in Example 9 was followed. After hydrolysis, the autoclave was opened and hexamethylenediamine (40.30 grams, 0.35 mole) and water (25.00 grams) were added. The autoclave was resealed. The autoclave was pressurized to 300 psig with nitrogen and then the pressure was released. This operation was repeated for a total of 3 times. The autoclave was pressurized to 300 psig with nitrogen and then vented to 20 psig nitrogen. With stirring, the autoclave was heated to 275° C. with the vent set at 250 psig. After achieving 275° C., the pressure was reduced down to 20 psig over one hour. The autoclave was then pressurized to 100 psig with nitrogen and allowed to cool to room temperature. The resulting product was analyzed for relative viscosity (RV), end groups, and bis(hexamethylene)triamine (BHMT) level with the results shown below in Table 2.

COMPARATIVE EXAMPLE B

This example was run under conditions similar to Example 9 except that a stoichiometric amount of hexamethylenediamine, based on the starting amount of adiponitrile, was used.

A mixture of adiponitrile (39.00 grams, 0.36 mole), water (32.40 grams, 1.80 mole), phosphorous acid (0.02 grams), and calcium hypophosphite (0.007 grams) was added to a 300 cc stainless steel autoclave. The hydrolysis procedure described in Example 9 was used. After hydrolysis, the autoclave was opened and hexamethylenediamine (41.60 grams, 0.36 mole), and water, (5.00 grams) were added. The autoclave was resealed and the polymerization procedure described in Example 9 was followed. The resulting product was analyzed for relative viscosity (RV), end groups and bis(hexamethylene)triamine (BHMT) level with the results shown below in Table 2. Using a stoichiometric amount of diamine based on the starting adiponitrile results in a significantly lower RV polyamide having a large excess of amine ends and high BHMT levels compared to Examples 9, where the amount of diamine added was reduced to account for loss of adiponitrile during the hydrolysis reaction.

EXAMPLE 12

A mixture of adiponitrile (6375.05 grams, 58.8 moles), water (5305.66 grams, 294.8 mole), phosphorous acid (3.19 grams), and calcium hypophosphite (1.15 grams) was added to a 35 gallon stainless steel autoclave. The autoclave was flushed with nitrogen and heated to 250° C. with stirring. After achieving 250° C., a water purge was pumped into the autoclave at a rate of 30 cc per minute. Through venting, the reaction pressure was maintained at 250 psig throughout the course of the experiment. After 6 hours at 250° C., the water purge was discontinued and the autoclave was allowed to cool to room temperature. The autoclave was opened and a 78.34 weight percent aqueous solution of hexamethylenediamine (8744.95 grams, 58.96 mole of hexamethylenediamine) was added. The autoclave was resealed and flushed with nitrogen. With stirring, the autoclave was heated to 275° C. with the vent set at 250 psig. After achieving 275° C., the pressure was reduced down to atmospheric pressure over 1 hour. The polymerization was finished at atmospheric pressure at 275° C. for 30 minutes. The polymer was then extruded out of the autoclave. The resulting polymer was analyzed for relative viscosity (RV), end groups, and bis(hexamethylene)triamine (BHMT) level with the results shown below in Table 2.

TABLE 2

Polymer Analytical Results

| Example | RV | End Group Analysis Amine (mpmg[a]) | Acid (mpmg) | BHMT (ppm) |
| --- | --- | --- | --- | --- |
| 9 | 69 | 34 | 64 | 365 |
| 10 | 40 | 25 | 99 | 752 |
| 11 | 34 | 82 | 77 | 880 |
| 12 | 37 | 50 | 64 | 623 |
| B | 13 | 317 | 13 | 1720 |

[a]moles per million grams of polymer

Having thus described and exemplified the invention with a certain degree of particularity, it should be appreciated that the following claims are not to be so limited but are to be afforded a scope commensurate with the wording of each element of the claim and equivalents thereof.

We claim:

1. A process for producing a polyamide from an α,ω-dinitrile and an α,ω-diamine comprising the steps of:
    (a) contacting an α,ω-dinitrile with water and an effective amount of catalyst in a reactor, in the absence of the α,ω-diamine, at a temperature and a pressure to cause hydrolysis of the α,ω-dinitrile, and for a time sufficient to hydrolyze the α,ω-dinitrile to an overall conversion of at least 95% to produce a hydrolysate; wherein water is added during said hydrolysis with simultaneous venting of the reactor to remove ammonia and water vapor;
    (b) adding an α,ω-diamine to said hydrolysate produced in step (a);
    (c) heating the hydrolysate and diamine mixture in the presence of water for a time sufficient to polymerize; and then (d) recovering polyamide characterized by a triamine content of less than 1,000 ppm.

2. A process of claim 1 wherein said α,ω-dinitrile is adiponitrile, said α,ω-diamine is hexamethylenediamine, and said catalyst for hydrolysis is a mixture of phosphorous acid and calcium hypophosphite and wherein said recovered polyamide is poly(hexamethylene adipamide).

3. A polyamide produced according to the process of claim 1.

4. A polyamide produced according to the process of claim 2.

5. The process of claim 1, wherein the polyamide produced is poly(hexamethylene adipamide).

6. The process of claim 1, wherein in step (c), said mixture is heated to a temperature between 200° C. and 350° C.

7. The process of claim 1, wherein in step (a), said temperature is between 200° C. and 300° C.

8. The process of claim 1, wherein in step (a), said temperature is between 220° C. and 280° C.

9. The process of claim 1, wherein steps (a)–(d) are run in the absence of air.

10. The process of claim 1, wherein in step (a), the water is added at a rate within the range of 0.1 to 10 moles of water per hour per one mole of dinitrile.

11. The process of claim 1, wherein in step (b), the α,ω-diamine is added to said hydrolysate in an amount within 10 mole percent of equimolar based on the starting α,ω-dinitrile.

12. The process of claim 1, wherein in step (b), the α,ω-diamine is added to said hydrolysate in an amount that is less than equimolar based on the starting α,ω-dinitrile.

13. The polyamide of claim 3 having balanced amine ends.

* * * * *